US007617330B2

(12) United States Patent
Ellerbrock et al.

(10) Patent No.: US 7,617,330 B2
(45) Date of Patent: Nov. 10, 2009

(54) SYSTEM AND METHOD FOR PRELOADING A BUS CONTROLLER WITH COMMAND SCHEDULE

(75) Inventors: Philip J. Ellerbrock, St. Peters, MO (US); Daniel W. Konz, Florissant, MO (US); Marshall Watts, Wildwood, MO (US)

(73) Assignee: The Boeing Company, Seattle, WA (US)

( * ) Notice: Subject to any disclaimer, the term of this patent is extended or adjusted under 35 U.S.C. 154(b) by 709 days.

(21) Appl. No.: 10/475,468

(22) PCT Filed: Apr. 26, 2002

(86) PCT No.: PCT/US02/13190

§ 371 (c)(1),
(2), (4) Date: Oct. 21, 2003

(87) PCT Pub. No.: WO02/088965

PCT Pub. Date: Nov. 7, 2002

(65) Prior Publication Data

US 2004/0158616 A1    Aug. 12, 2004

(51) Int. Cl.
*G06F 15/177* (2006.01)
*G06F 15/173* (2006.01)
*G06F 15/16* (2006.01)
*G06F 3/00* (2006.01)
(52) U.S. Cl. .................... 709/253; 709/220; 709/221; 709/223; 709/224; 710/15; 710/24
(58) Field of Classification Search ......... 709/220–221, 709/223–224, 253; 710/15, 24
See application file for complete search history.

(56) References Cited

U.S. PATENT DOCUMENTS 4,123,794 A    10/1978    Matsumoto (Continued)

FOREIGN PATENT DOCUMENTS

EP    0 449 458 A1    10/1991

(Continued)

OTHER PUBLICATIONS

Wright, M.; "*µP core and proprietary command set allow SCSI-2 ICs to automate bus sequences*"; EDN Electrical Design News, Rogers Pub. Co., Englewood, Colorado (US), vol. 36, No. 16, Aug. 5, 1991, pp. 107, XP000260663; ISSN: 0012-7515.

(Continued)

*Primary Examiner*—Nathan J Flynn
*Assistant Examiner*—Joshua Joo
(74) *Attorney, Agent, or Firm*—Alston & Bird LLP (57) ABSTRACT

A system and method is provided for communicating with at least one network device via a network bus comprising a bus controller and a host computer. The bus controller executes a series of instructions, which can be transferred to the bus controller from the host computer. The instructions are executed in a manner independent of the host computer so as to reduce the workload of the host computer. Since the bus controller can execute the series of instructions without further intervention of the host computer, the host computer can perform other operations concurrent with the execution of the series of instructions by the bus controller. In one embodiment, at least one of the instructions has an associated data field that is variable and can be altered by the host computer, such that the host computer can alter the instruction used by the bus controller.

17 Claims, 6 Drawing Sheets

U.S. PATENT DOCUMENTS

| | | | |
|---|---|---|---|
| 4,137,562 A | | 1/1979 | Boeck et al. |
| 4,304,001 A | | 12/1981 | Cope |
| 4,371,932 A | | 2/1983 | Dinwiddie, Jr. et al. |
| 4,385,350 A | | 5/1983 | Hansen et al. |
| 4,494,192 A | | 1/1985 | Lew et al. |
| 4,688,168 A | | 8/1987 | Gudaitis et al. |
| 4,942,571 A | | 7/1990 | Möller et al. |
| 4,969,147 A | | 11/1990 | Markkula, Jr. et al. |
| 4,996,684 A | | 2/1991 | Morley et al. |
| 5,138,709 A | | 8/1992 | Jones et al. |
| 5,223,806 A | | 6/1993 | Curtis et al. |
| 5,251,208 A | | 10/1993 | Canniff et al. |
| 5,274,783 A | | 12/1993 | House et al. |
| 5,303,350 A | * | 4/1994 | Yu et al. ............. 713/600 |
| 5,367,678 A | | 11/1994 | Lee et al. |
| 5,437,060 A | | 7/1995 | Delamater et al. |
| 5,445,128 A | | 8/1995 | Letang et al. |
| 5,615,404 A | | 3/1997 | Knoll et al. |
| 5,623,610 A | | 4/1997 | Knoll et al. |
| 5,652,839 A | * | 7/1997 | Giorgio et al. ............. 709/224 |
| 5,694,555 A | | 12/1997 | Morriss et al. |
| 5,737,356 A | | 4/1998 | Harrison et al. |
| 5,742,847 A | | 4/1998 | Knoll et al. |
| 5,748,923 A | | 5/1998 | Eitrich |
| 5,801,602 A | | 9/1998 | Fawal et al. |
| 5,809,224 A | * | 9/1998 | Schultz et al. ............. 714/7 |
| 5,815,516 A | | 9/1998 | Aaker et al. |
| 5,828,857 A | * | 10/1998 | Scalise ............. 713/600 |
| 5,867,736 A | * | 2/1999 | Jantz ............. 710/74 |
| 5,909,556 A | | 6/1999 | Morriss et al. |
| 5,915,094 A | | 6/1999 | Kouloheris et al. |
| 5,933,611 A | | 8/1999 | Shakkarwar |
| 5,946,215 A | | 8/1999 | Mito |
| 5,960,212 A | * | 9/1999 | Mak ............. 712/34 |
| 5,978,875 A | | 11/1999 | Asano et al. |
| 6,013,108 A | | 1/2000 | Karolys et al. |
| 6,076,115 A | * | 6/2000 | Sambamurthy et al. ..... 709/250 |
| 6,115,713 A | | 9/2000 | Pascucci et al. |
| 6,167,465 A | | 12/2000 | Parvin et al. |
| 6,185,007 B1 | | 2/2001 | Hayashi et al. |
| 6,185,607 B1 | * | 2/2001 | Lo et al. ............. 709/213 |
| 6,195,724 B1 | | 2/2001 | Stracovsky et al. |
| 6,199,121 B1 | * | 3/2001 | Olson et al. ............. 710/24 |
| 6,273,771 B1 | | 8/2001 | Buckley et al. |
| 6,452,938 B1 | | 9/2002 | Fawal et al. |
| 6,598,108 B1 | * | 7/2003 | Ashida et al. ............. 710/305 |
| 6,600,972 B2 | | 7/2003 | Morrison et al. |
| 6,646,564 B1 | * | 11/2003 | Azieres et al. ............. 340/679 |
| 6,681,346 B2 | * | 1/2004 | James et al. ............. 714/42 |
| 6,834,212 B1 | * | 12/2004 | Patel et al. ............. 700/121 |
| 2002/0108023 A1 | * | 8/2002 | Constable et al. ............. 711/163 |
| 2005/0132040 A1 | * | 6/2005 | Ellis et al. ............. 709/223 |

FOREIGN PATENT DOCUMENTS

| | | |
|---|---|---|
| EP | 1 014 271 A1 | 8/1998 |
| JP | 01-248257 A | 10/1989 |
| JP | 03-171245 A | 7/1991 |
| JP | 03-269752 A | 12/1991 |
| JP | 06-075898 A | 3/1994 |
| JP | 07-211332 A | 8/1995 |
| JP | 07-253860 A | 10/1995 |
| JP | 09-251437 A | 9/1997 |
| WO | WO 87/02800 | 5/1987 |
| WO | WO 94/03852 | 2/1994 |
| WO | WO 94/08298 | 4/1994 |
| WO | WO 95/25024 | 9/1995 |
| WO | WO 99/63409 | 12/1999 |

OTHER PUBLICATIONS

European Search Report, Sep. 26, 2005.

Office Action for Japanese Patent Application No. 2002-586195, mailed Jun. 23, 2006.

Office Action for Japanese Patent Application No. 2002-586195, mailed Aug. 31, 2007.

Infineon: *C167CR 16-BIT Single-Chip Microcontroller*; Apr. 2000; 72 pages; XP-002201995; Published by Infineon Technologies AG.

Tobias Wenzel; Infineon: *CAN Baudrate Detection with Infineon CAN Devices*; Jul. 1999, 11 pages; XP-002201996.

PCT Notification of Transmittal of the International Search Report, PCT International Search Report for PCT/US02/13190 (filed Apr. 26, 2002).

PCT Notification of Transmittal of the International Search Report, PCT International Search Report for PCT/US02/13246 (filed Apr. 26, 2002).

PCT Notification of Transmittal of the International Search Report, PCT International Search Report for PCT/US02/13303 (Field Apr. 26, 2002).

PCT Notification of Transmittal of the International Search Report; PCT International Search Report for PCT/US02/13366, (Apr. 26, 2002).

PCT Notification of Transmittal of the International Search Report, PCT International Search Report for PCT/US02/13367 (Filed Apr. 26, 2002).

Grounds of Opposition, corresponding EP Patent No. 1 390 856, dated Mar. 13, 2008.

Response to Opposition of EP Patent No. 1 390 856, dated Oct. 31, 2008 (including list of cited documents).

Maury Wright, Micro Processor Core And Proprietary Command Set Allow SCSI-2 ICS To Automate Bus Sequences, *EDN Electrical Design News*, Rogers Published Company, Englewood, Colorado, US, vol. 36, No. 16, Aug. 5, 1991, p. 107 (Opposition Ref. B7).

*Intermec: Getting Started Guide*, 9180 Network Controller, 1998 (Opposition Ref. D14).

Translation of previously submitted—Smart Can—Smart Controller Area Network, *User's Manual*, Rolf Uhlig Computer GmbH & Co., Jun. 3, 1993 (Opposition Ref. D18).

Translation of previously submitted—*Controller Area Network*, Gundlagen und Praxis/Wolfhard Lawrenz, *Principles and Practice*, Heidelberg, Huthig, Book 2, completely revised and extended edition, pp. 73-83 (German Version)-pp. 7-18 (Translation), 1997 (Opposition Ref. FW2).

Translation of previously submitted—*Microprocessor Manual*, published by Thomas Beierlein and Olaf Hagen bruch, pp. 190-195 (German Version)-pp. 1-6 (Translation), 1999 (Opposition Ref. FW1).

* cited by examiner

SYSTEM AND METHOD FOR PRELOADING A BUS CONTROLLER WITH COMMAND SCHEDULE

FIELD OF THE INVENTION

The present invention relates generally to systems and methods for reducing the workload of a host computer and, more particularly, to systems and methods for preloading a bus controller with a command schedule that can be executed without intervention by the host computer, typically on a repeating basis, and updated by the host computer if desired.

BACKGROUND OF THE INVENTION

As systems, such as the multimedia entertainment, communications, process control systems, and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required can quickly become excessively large, both in terms of the space required for the wiring and the cost of the wiring and the attendant installation. Moreover, as the amount of dedicated wiring increases, the overall complexity of the system also generally increased as well as the likelihood that some portion of the wiring might be damaged or broken during or following installation.

As such, network buses have been developed to provide a common communication path between a plurality of devices. In automotive and aerospace applications, for example, a network bus can be utilized to monitor various components and to collect diagnostic and status information. In this regard, diagnostic and status information relating to the strain, acceleration, pressure and/or temperature to which the various components are subjected may be collected and analyzed. By way of further example, a network bus architecture is currently being developed to support communications and the delivery of multimedia information to the occupants of a vehicle, such as an automobile, minivan, sports utility vehicle, aircraft, boat or the like. Advantageously, this network bus would transport the audio signals, including streaming audio signals, produced by one or more of a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. Also, the network bus may transmit video signals, including streaming video signals, from a television receiver, a videocassette recorder or other video source to one or more video monitors. In addition, the network bus may transmit sensor and actuator signals to and from devices such as drivetrain devices, passive restraint devices, crash avoidance devices, drive-by-wire devices, or the like.

In addition to the variety of devices that are connected to a network bus, one or more controllers are also generally connected to the network bus for receiving data from the various devices and for sending commands to the devices. Among other things, these commands specify the manner in which the various devices are to function including the manner in which the various devices are to transmit information over the network bus. Additionally, the controller(s) can receive input from an operator, such as an occupant of the vehicle. This input can include, for example, an indication of the source(s) of the signals to be transmitted over the network bus as well as the destination of the signals.

In one system, one or more bus controller(s) operate under the control of and in conjunction with a host computer, also known as a host processor. The host computer typically provides the bus controller(s) with the commands to be transmitted via a network bus. In return, the host computer is provided with the responses from the network devices by the bus controller(s). The host computer can coordinate or synchronize the activities of the bus controller(s) based upon the timing of the commands issued to the bus controller(s) by the host computer. Additionally, the host computer executes the process control algorithms that direct a number of system-wide operations, while also performing a substantial amount of data analysis and data mining of the data provided by the network devices.

As a result of the various functions that the host computer must perform, the host computer may sometimes be unable to provide commands to the bus controller(s) in accordance with the desired schedule. In this regard, the system-wide operations that are performed by the host computer are typically designated as high priority operations that must be performed to the exclusion of other functions, including the provision of commands to the bus controller(s). The difficulties faced by a host computer are exacerbated by systems having a high bandwidth since the host computer will be expected to interact more frequently with the bus controller(s). Additionally, a number of systems are designed to be time deterministic in that the network devices are triggered to perform a function by commands issued by the bus controller(s). Since it is often desirable for the network devices to perform a particular function, such as to obtain a data sample, at a specific time, the bus controller(s) preferably issues commands at specific times as well to trigger the network devices to perform the particular function. As the workload of the host computer increases with higher bandwidth, however, the host computer will be less likely to be able to consistently time the issuance of commands to the bus controller(s) such that bus the controller(s) can, in turn, place the commands on the network bus in a time deterministic manner.

For example, the system may be designed to collect data from a plurality of sensors at a predetermined sampling frequency. Since the collection of data is triggered by the commands issued by the bus controller(s), the commands issued by the bus controller(s) must therefore be issued at the same predetermined sampling frequency. As such, if the host computer is unable to direct the bus controller(s) to issue the commands at the same predetermined sampling frequency, the system will be unable to acquire the data in accordance with the desired schedule and, therefore, the data will contain a significant amount of timing jitter resulting in amplitude and phase distortion.

In an attempt to address these shortcomings, host computers having faster processors with an embedded software process or a real-time operating system have been utilized. While this approach can operate in a time-deterministic manner, the host processor must still schedule the network traffic along with the performance of its other functions. In addition, some systems include protocol encoders and decoders in an attempt to address these shortcomings, but these systems are still required to schedule the network traffic. Thus, none of these approaches relieve the host computer of the necessity of directing the network traffic via the bus controller(s). It would therefore be desirable to reduce the workload of the host computer such that the bus controller(s) could be provided with commands in a more predictable manner, thereby permitting the bus controller(s) to issue commands in a time-deterministic manner.

SUMMARY OF THE INVENTION

In light of the foregoing background, the present invention provides an improved system and method for communicating with at least one network device via a network bus. The system and method of the present invention reduce the workload of a host computer by permitting the bus controller to issue commands in accordance with a command schedule, (sometimes referred to as an operation schedule), in a manner independent of a host computer. In this regard, the host computer can transfer a series of instructions to the bus controller such that the bus controller is preloaded with the command schedule. According to one aspect of the present invention, the system includes a host computer and a bus controller disposed in electrical communication with both the host computer and the network bus. The bus controller includes a memory device for storing a series of instructions and is adapted to execute the series of instructions, typically repeatedly, in a manner independent of the host computer so as to control communications conducted via the network bus.

Thus, a series of instructions is initially transferred from the host computer to the bus controller such that the bus controller is preloaded with a command schedule. The series of instructions is then executed, typically repeatedly, in a manner independent of the host computer so as to control communications conducted via the network bus between the bus controller and the network devices. Since the bus controller can execute the series of instructions without further intervention of the host computer, the host computer is permitted to perform other operations concurrent with the execution of the series of instructions by the bus controller. For example, the host computer can perform data analysis and system operations without having to direct the bus controller to issue commands. In addition, by preloading the bus controller with a command schedule, the bus controller can issue the commands in a time-deterministic manner so as to support the acquisition of data and other types of communications via the network bus in accordance with a desired schedule.

As illustrated and discussed above, the systems and methods of the present invention provide the capability to execute deterministic network processes without using the host processor. Specifically, the systems and methods of the present invention identify instances where the commands issued by the bus controller are network protocol specific and periodically repetitive, (i.e., a series of protocol commands that are repeated in periodic succession). The systems and methods of the present invention remove these repetitive series of commands from the operations that the host processor must perform and preloads the commands and data into a command schedule, typically in the form of a series of instructions. As described thus far, however, the systems and methods of the present invention only preload command schedules that include series of commands and data that do not change during operation of the network system. There are some instances, however, where dynamic alteration of the commands or data listed in the command schedule during performance of the periodic command schedule is advantageous to allow the network system to achieve better process control. In other words, it would be advantageous to provide a preloaded command schedule having commands and data that could be altered or updated during operation based on the process associated with the network system.

In light of this, the system and methods of the present invention, in some embodiments, provide procedures permitting the host processor to modify the content and execution of the embedded command schedule to thereby provide better process control. The systems and methods of the present invention enable the host processor to receive and analyze data from the network, calculate analytical results, and produce appropriate process modifications that can be reinserted as commands or arguments into the command schedule. Although the host processor must periodically evaluate and modify the preloaded commands and data of the command schedule in these embodiments, the host processor is freed to perform higher level processing because the bulk of the processing in accordance with the command schedule is performed by the bus controller.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
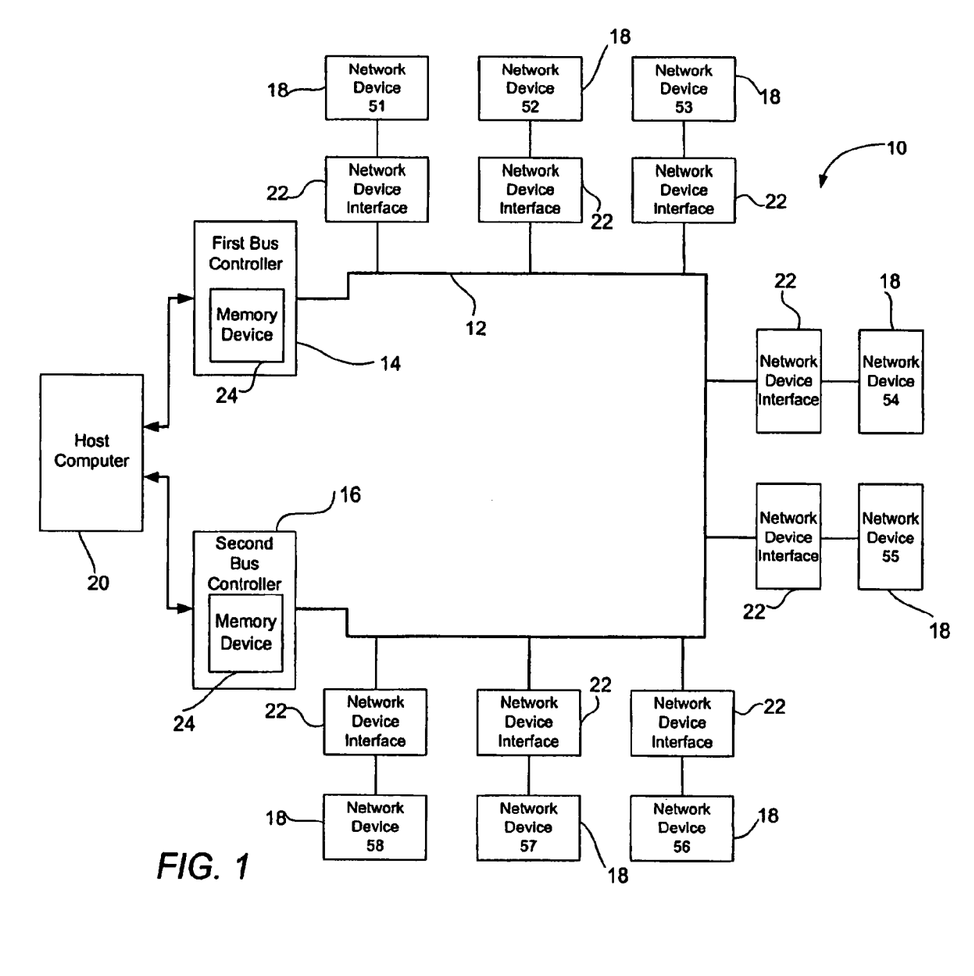
FIG. 1 is a schematic representation of a system according to one embodiment of the present invention that includes a pair of bus controllers connected to opposite ends of a network bus.

Referring now to FIG. 1, a system 10 in accordance with one embodiment of the present invention is depicted. While several embodiments of the system are illustrated and will be hereinafter described for purposes of example, other types of systems can utilize the present invention. Moreover, the system and method of the present invention will be primarily described in conjunction with automotive and aerospace applications, such as automotive and aerospace applications designed to support communications and the delivery of multimedia information to the occupants of a vehicle and/or to monitor various components and to collect diagnostic and status information and/or for process control applications as they would apply to engine control, transmission control, drive or brake by wire, etc. However, the system and method of the present invention can be utilized in conjunction with a variety of other applications, both in the automotive and aerospace industries and outside of those industries. For example, the system and method can be utilized in industrial automation and ground testing applications.

As shown in FIG. 1, the system 10 of one embodiment includes a network bus 12 that contains a first bus controller 14, a second bus controller 16, and a plurality of network devices 18. The bus controllers are electrically connected to the network bus. In the illustrated embodiment, the first and second bus controllers are co-located such that the network bus forms a loop between the pair of bus controllers. As will be apparent, the bus controllers can be located at different positions in the network. The system depicted in FIG. 1 also includes a plurality of network devices 18 electrically connected to the network bus and, in turn, to the bus controllers, at different points along the network bus. Thus, the network bus supports communications between the bus controllers and the network devices, as well as communications between the network devices themselves.

The bus controllers 14 and 16 are designed to issue commands to respective network devices 18 and, in at least some instances, to receive data from the network devices. For example, the commands may dictate that a network device provide a particular type of data, such as status or other diagnostic data. Alternatively, the commands issued by the bus controllers can direct one or more of the network devices to provide signals of a predetermined type, such as audio signals, video signals or the like, and for one or more of the other network devices to receive the signals.

Although various types of bus controllers can be utilized, one advantageous type of bus controller is the network controller described by U.S. patent application Ser. No. 09/736,878 entitled Network Controller for Digitally Controlling Network Devices Via a Common Bus, filed Dec. 14, 2000, the contents of which are incorporated herein by reference.

As described in U.S. patent application Ser. No. 09/736,878 and as illustrated in FIG. 1, the bus controllers 14 and 16 are also generally disposed in electrical communication with a host computer 20, also termed a host processor, that generally directs the operation of the bus controllers. In a conventional system, for example, the host computer directs the issuance of the commands by the bus controllers as well as the timing of the commands. Additionally, the host computer can mine and otherwise analyze the data received by the bus controllers from the network devices and can perform a number of other high priority system-wide operations. Additional details regarding the interaction and respective functions of the bus controllers and the host computer will be described hereinafter.

During ordinary operation of the system 10 depicted in FIG. 1, the first bus controller 14 typically serves as a master controller and is responsible for issuing commands over the network bus 12. The first bus controller also acts as the primary monitor of the network bus and can receive responses provided by the network devices 18.

Various types of network buses 12 can be employed. Typically, the network bus consists of one, two, three or more pairs of wires, such as differential twisted-pair copper wires, for transmitting commands, data and other signals. As such, the network bus can be designed to support either a standard half duplex configuration via one pair of wires or a fill duplex configuration via two pairs of wires. In some embodiments designed for synchronous operation, one of the pair of wires can be utilized to transmit a clock signal typically from a bus controller to the network devices 18. Still further, the network bus can include a pair of wires for supplying power and a common ground to the network devices.

The system 10 can include a wide variety of network devices 18; most, if not all, of which are located remote from the bus controllers. For example, the network devices can include sensors for providing data, such as status or diagnostic data, to the bus controllers and, in turn, to the host computer 20 so that the health and/or operation of whatever the sensors are sensing can be monitored. In an automotive application, for example, the network devices can include sensors for monitoring the throttle position, the oil pressure, the water temperature, the transmission fluid pressure, the seat position, the antilock brake system, the suspension, the passive restraint system and the steering system, to name but a few. In order to provide feedback to the operator, the network devices can also include one or more displays, such as the dashboard displays in a vehicle, for displaying the status or diagnostic data, either directly or after appropriate processing. Alternatively, the network devices may include an actuator for performing a particular function in response to a command from the bus controller.

In the automotive application, for example, the network devices can include actuators for controlling the throttle position, the anti-lock brake system, the suspension, the passive restraint system and the active suspension system, to name but a few. Still further, the network devices may include an audio or video source. In this regard, the network devices can include radio receivers, tape cassette players, compact disc players, cellular telephone receivers or other audio sources for providing control signals and audio signals, including, in some instances, streaming audio signals, to the network bus. Correspondingly, the network devices can include speakers, headphone jacks or the like for receiving audio signals from the network bus and for providing a corresponding audible output. Similarly, network devices can include a television receiver, a video cassette player or other video source for providing video signals, including streaming video signals, to the network bus. Accordingly, network devices can include a video monitor or the like for receiving the video signals and for displaying images based upon the video signals.

While the network devices 18 may be directly connected to the network bus 12, the network devices of one advantageous embodiment are associated with respective network device interfaces 22 as described by U.S. patent application Ser. No. 09/735,146 entitled Network Device Interface for Digitally Interfacing Data Channels to a Controller Via a Network, filed Dec. 12, 2000, the contents of which are incorporated herein in their entirety. In this advantageous embodiment, the network device interface is disposed in electrical communication with the network bus for transmitting signals to the network bus and for receiving signals from the network bus. Each network device interface is also in communication with one or more network devices via respective data channels. While each network device interface is shown to be connected to a single network device in FIG. 1, a network device interface could be connected to two or more network devices, if so desired. As described by U.S. patent application Ser. No. 09/735,146, a network device interface performs various functions to facilitate communications by the network device over the network bus. For example, a network device interface may store the data collected by the associated network device (s) such that the stored data may be provided to the bus controllers 14 and 16 via the network bus upon request. If the network device is an analog device, the network device interface may also convert signals between the digital format supported by the network bus and the analog format supported by the network device.

Upon initialization of the system 10, the first bus controller 14 inventories the network devices 18 connected to the network bus 12 and assigns a unique logical address to each network device so that the bus controllers can communicate with a specific network device or a specific group of network devices. A wide variety of techniques can be utilized to inventory the network devices connected to the network bus and to assign unique logical addresses to the network devices. One advantageous technique for inventorying the network devices and assigning unique logical addresses is the bit competition technique described by U.S. patent application Ser. No. 09/735,146 as well as U.S. Provisional Patent Application No. 60/286,793 entitled Systems and Methods for Assigning an Address to a Network Device Added to an Existing Network, filed Apr. 26, 2001, and PCT Patent Application No. PCT/US02/13366 entitled Systems and Methods for Assigning an Address to a Network Device Added to an Existing Network, filed Apr. 26, 2002, the contents of which are also incorporated herein in their entirety.

In operation, the first bus controller 14 issues various commands and respective network devices 18 respond based upon the commands. The bus controller and the network devices can communicate according to any of a number of different protocols. As described in U.S. patent application Ser. No. 09/736,878, for example, the bus controllers and the network devices can communicate according to a Manchester-encoded bi-phase sensor and system (BiSenSys) protocol. Alternatively, the bus controllers and the network devices can communicate according to a protocol compatible with a universal asynchronous receiver transmitter (UART) physical layer. Preferably, however, the protocol is selected to minimize the overhead and to correspondingly maximize the data transfer capability. Further, the protocol is preferably selected to be relatively simple such that neither the network devices nor the network device interfaces 22 will require a high level processor. Instead, the bus controllers and the associated host computer 20 can include the majority of the processing power and the network device interfaces can include logic that is readily implemented in hardware, software or firmware. The communications supported by the system 10 may also be either synchronous or asynchronous and may involve the transmission of various types of messages. As described by U.S. patent application Ser. No. 09/736,878, for example, one advantageous communications technique is based upon the transmission of message frames that include command frames and data frames having respective predetermined lengths or sizes.

Depending upon the protocol, the system can also support various command sets. As with the protocol, the command set is preferably selected to minimize the overhead that must be transmitted via the network bus and to be relatively simple. One example of a suitable command set is described by U.S. patent application Ser. No. 09/735,146 and is reproduced below.

| Command (hex) | Command Description |
|---|---|
| Service Commands | |
| 00 | No Op |
| 01 | Built in Test |
| 02 | Reset |

-continued

| Command (hex) | Command Description |
|---|---|
| 03 | Read Status Register |
| 04 | Device Inventory Enable |
| 05 | Device Inventory |
| 06 | Control Pass |
| 07 | Wake |
| 08 | Sleep |
| 09 | E-Calibration |
| 0A | Z-Calibration |
| 0B | Synchronize |
| 0C | Baud Select |
| 0D | Set Source |
| 0E | Insert Terminator |
| 0F | Reserved |
| Data Commands | |
| 20 | Trigger |
| 21 | Trigger on Pip |
| 22 | Trigger and Read |
| 23 | Read In-Data Register Word |
| 24 | Read In-Data Stack Word |
| 25 | Read In-Data Stack Double Word |
| 26 | Read In-Data Stack Block |
| 27 | Query In-Data/Out-Data Stack Depth |
| 28 | Write Out-Data Stack Word |
| 29 | Write Out-Data Stack Word/Acquire to In-Data Register |
| 2A | Write Out-Data Stack Block |
| 2B-2F | Reserved |
| Memory Commands | |
| 30 | Set Memory Pointer |
| 31 | Read Memory Word with Current Pointer |
| 32 | Read Memory Block with Current Pointer |
| 33 | Write Memory Word with Current Pointer |
| 34 | Write Memory Block with Current Pointer |
| 35 | Read Memory Word with Passed Pointer |
| 36 | Read Memory Block with Passed Pointer |
| 37 | Write Memory Word with Passed Pointer |
| 38 | Write Memory Block with Passed Pointer |
| 39-7F | Reserved |

One level of commands is the service commands. Service commands are intended for network housekeeping, network device interface status, power control, calibration and bus master arbitration. A second type of commands is data type commands. These commands are tailored for time-deterministic data acquisition and control. Network efficiency is maximized by permitting network devices to move one or more data points directly, or more than one data point as defined-length block transfers. For example, the Trigger command is used by the bus controllers to initiate an incoming data measurement from a sensor or cause a data conversion to a physical quanitity for an actuator.

In addition to the service and data type commands, the command set of this example also includes memory commands. These commands permit access to specific defined memory locations or functions to which data can be written or read. This permits random access data blocks to be efficiently transferred between one system and another with little overhead. It also permits direct memory access and/or one or more data buffers blocks to be moved. Further details regarding the command set are provided by U.S. patent application Ser. No. 09/735,146, as well as U.S. Provisional Patent Application No. 60/286,644 entitled System and Method for Reestablishing the Impedance Stability of a Network Bus, U.S. Provisional Patent Application No. 60/286,759 entitled Systems, Methods and Bus Controllers for Creating an Event Trigger on a Network Bus, both filed Apr. 26, 2001, and PCT Application No. PCT/US02/13367 entitled Systems and Methods for Maintaining Network Stability, and PCT Patent Application No. PCT/US02/13303 entitled Systems, Methods and Bus Controllers for Creating an Event Trigger on a Network Bus, both filed concurrently herewith, the contents of all of which are also incorporated herein in their entirety.

According to the present invention, the bus controller 14 and, more particularly, a memory device 24 associated with the bus controller is preloaded with a series of instructions referred to as microcode, thereby forming a command schedule, (sometimes referred to as an operation schedule). (See, for example FIG. 2.) While the series of instructions can be provided in various manners, the host computer 20 typically preloads the memory device of the bus controller with the series of instructions. The bus controller can thereafter execute the series of instructions without further intervention or direction by the host computer. The host computer is accordingly permitted to spend a greater percentage of its processing time and power performing other functions including system-wide operations and data analysis. Moreover, by preloading the series of instructions, (i.e., command schedule), into the bus controller, the bus controller can insure that the various commands are placed on the network bus at predefined times, thereby permitting the time-deterministic operation of the system 10.

While any series of instructions can be preloaded into the bus controller 14, the system 10 of one advantageous embodiment preloads a series of instructions that is repeatedly executed. Thus, a relatively small series of instructions can be preloaded into the bus controller and can be repeatedly executed by the bus controller in order to control communications over the network bus 12 for a substantial period of time, thereby freeing up the host computer 20 for other functions. Even though a repetitive series of instructions are preloaded into the bus controller and are repeatedly executed by the bus controller, the host computer may need to occasionally provide additional instructions in order to direct the bus controller to perform functions other than those contemplated by the preloaded series of instructions. Even in this instance, however, the workload of the host computer will be substantially decreased and the reliability with which the bus controller can operate in a time-deterministic manner is increased.

Typically, the series of instructions is preloaded into the bus controller 14 either before or during run-time of the bus controller. In embodiments where the memory device 24, which stores the series of instructions, is nonvolatile memory, the bus controller can begin to execute the commands upon power up or upon direction by the host computer 20. Alternatively, in embodiments where the memory device is volatile memory, the host computer must load the series of instructions into the bus controller following power up and prior to the bus controller commencing execution of the commands.

Figure 2:
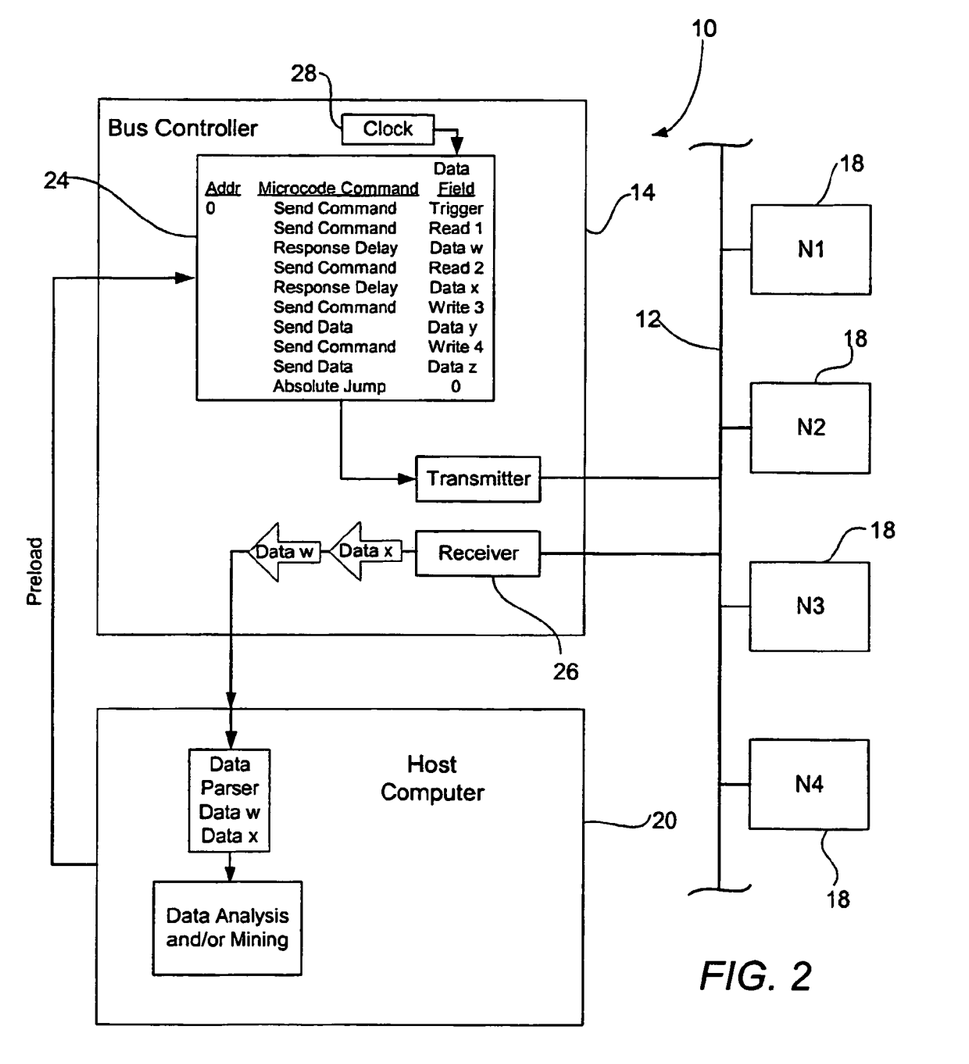
FIG. 2 is a block diagram of a system in accordance with one embodiment of the present invention which depicts a command schedule preloaded into a bus controller.

The series of instructions can include a variety of microcode commands, some of which may have corresponding data fields. For purposes of example, however, one set of microcode commands will be described hereinbelow. In this exemplary embodiment, the microcode commands include a Reset command for resetting execution of the series of instructions to the address of the memory device 24 designated as zero. As indicated in FIG. 2, the series of instructions are generally loaded into the memory device such that the initial command is located at a memory address of zero. Thus, the Reset command essentially causes the execution of the series of instructions to begin the initial command once again. As will be understood, the Reset command is only valid if the memory device associated with the bus controller includes microcode commands, with no action being taken if the memory device does not include microcode commands.

The microcode commands also include a Pause command for pausing execution of the series of instructions. Following the Pause command, operation can be resumed in response to receipt of a predetermined signal. Another microcode command is the Delay command, which inserts a time delay between microcodes issued via the network bus 12. Although neither the Reset nor Pause commands have a corresponding data field, the data field corresponding to the Delay command specifies the amount of delay (typically in measured nanoseconds) to be inserted.

Another microcode command is the Response Delay command. The Response Delay command inserts a delay between microcodes issued via the network bus 12 which, for housekeeping reasons, allows a response to the immediately preceding microcode to be provided by a network device 18. For all other delays, the Delay command is utilized. A data field associated with the Response Delay command specifies the number of data bytes of delay. Thus, the actual delay time will be dependant upon the baud rate at which communications are conducted via the network bus.

The microcode commands also include a Send Command which directs the bus controller 14 to transmit a command over the network bus 12. The command to be transmitted via the network bus is defined by data field associated with the Send Command instruction. As described below, for example, the Send Command may direct that a Read command or a Write command be transmitted via the network bus. As such, in these instances, the data field associated with the Send Command would also identify the address of the network device(s) 18 to which the command is directed. Typically, a parity bit is not included in the data field, but is automatically calculated and appended by the bus controller upon transmission of the command via the network bus. Similarly, the microcode commands also include a Send Data command for permitting a data frame to be transmitted via the network bus, typically from a network device to the bus controller, with the data frame to be transmitted defined in the data field associated with the Send Data command. As with Send Command, the parity bit is not included in the associated data field but, rather, it is automatically calculated and appended by the bus controller at the time of transmitting the command via the network bus.

The microcode command set of this exemplary embodiment also includes an Absolute Jump command that causes execution of the series of instructions to jump to the memory address defined by the associated data field. As with the Reset command, the Absolute Jump command is only valid if the memory device 24 associated with the bus controller 14 includes microcode commands, with no action occurring if the memory device does not include microcode commands. Finally, the microcode commands can include an Echo Data command that transmits a data frame via the network bus 12 utilizing data that is currently in a receive buffer of the bus controller (not shown). If the receive buffer does not include data or if the data in the buffer is not valid, the Echo Data command is skipped and no data is transmitted via the network bus. As before, the parity bit is automatically calculated and appended by the bus controller during transmission of the data frame via the network bus.

Although the microcode command set of this exemplary embodiment has been described above, a summary of the microcode command set and the associated data fields are provided in the following table:

| Microcode Command | Data Field |
| --- | --- |
| Reset | Data Field Not Used |
| Pause | Data Field Not Used |
| Delay | Specifies number of bus data bits of delay |
| Response Delay | Specifies number of bus data bits of delay |
| Send Command | Data for command frame to be sent (parity not included) |
| Send Data | Data for data frame to be sent (parity not included) |
| Absolute Jump | Address of jump location |
| Echo Data | Data Field Not Used |

Depending upon the operations that the bus controller 14 is to perform, a predefined series of instructions consisting of microcode commands and associated data fields are loaded into the memory device 24 associated with the bus controller. For purposes of illustration, one set of microcode commands and data fields are depicted in FIG. 2. As shown, the series of instructions are stored beginning with memory address zero, although the instructions can be stored at other locations, if so desired. Upon commencement of operations, the bus controller executes the initial microcode command, which is a Send Command. The Send Command has an associated data field that defines the command to be transmitted via the network bus 12 to be a Trigger command. Thereafter, another Send Command is provided with the associated data field defining the command to be transmitted as a Read command for the network device having address 1 (designated N1 in FIG. 2). The Response Delay command is then executed to allow the network device N1 an opportunity to read data, designated w, onto the network bus 12. Thereafter, another Send Command is executed with the associated data field designating a Read command to be transmitted to the network device having address 2 (designated N2 in FIG. 2). A Response Delay command is then executed to provide the network device N2 a period of time in which to read the requested date designed x, onto the network bus.

After data x has been read onto the network bus, a Send Command is again executed with the associated data field indicating that data should be written to the network device having address 3 (designated N3 in FIG. 2). Consequently, a Send Data command is executed with the data field identifying the data to be transmitted to the network device N3, designated y. Finally, another Send Command is executed with the data field specifying that data should be written to the network device having address 4 (designated N4 in FIG. 2). Then, a Send Data command is again executed with the associated data field providing the data to be written to the network device N4. In this instance, the data is designated z. In order to repeat the series of instructions, an Absolute Jump command is executed with the data field designating that the execution should jump to memory location zero, thereby effectively restarting execution of the process. Thus, the series of instructions of this example periodically reads data provided by network devices N1 and N2, such as first and second sensors, and periodically writes data to network devices N3 and N4, such as third and fourth actuators.

As also shown in FIG. 2, the bus controller 14 includes a receiver 26 for receiving the data that is read onto the network bus 12. This data is typically provided to the host computer 20 for additional processing. For example, the host computer can parse the data and can then perform various data analysis and/or mining operations depending upon the application.

Figure 3:
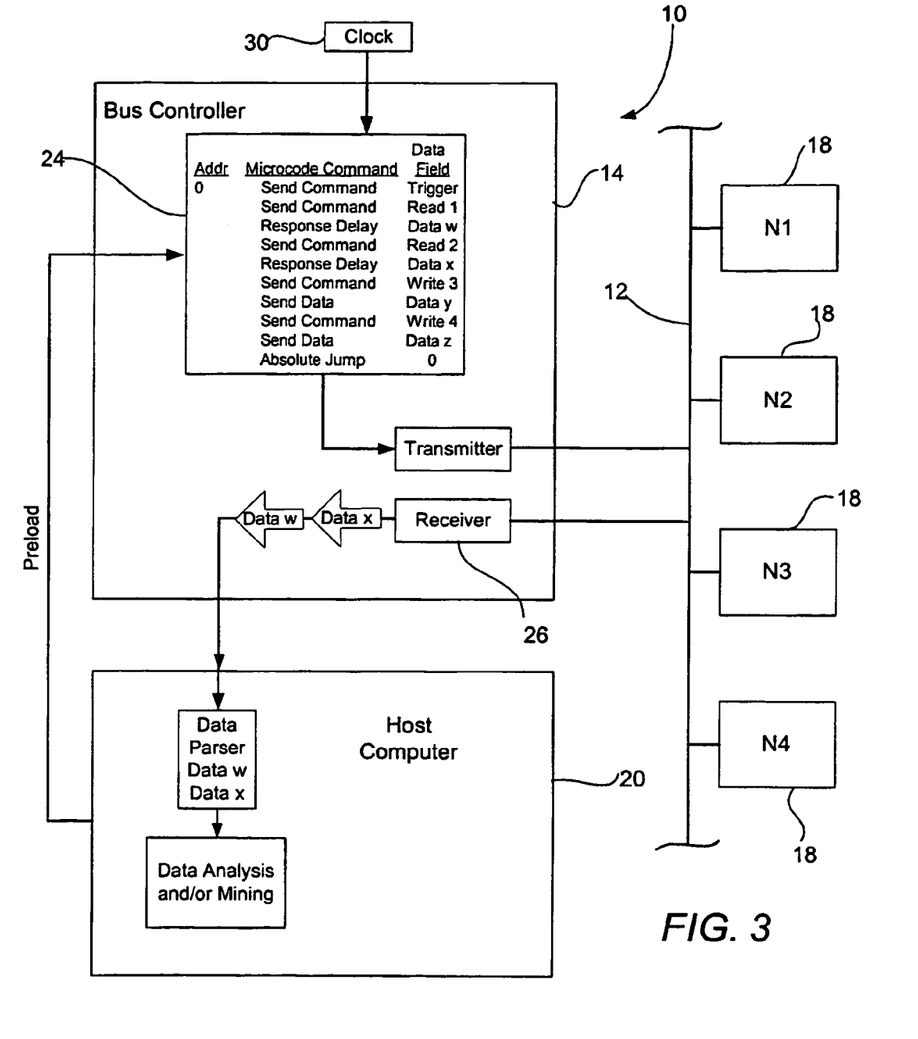
FIG. 3 is a block diagram of a system in accordance with another embodiment of the present invention in which the bus controller that is preloaded with the command schedule operates under the control of an external clock that can be utilized to synchronize the operations of multiple bus controllers.

Although the execution of the series of instructions preloaded into the memory device 24 associated with the bus controller 14 of FIG. 2 is controlled by an internal clock 28, the execution of the series of instructions can be controlled by an external clock. In this regard, FIG. 3 depicts a similar system 10 in which an external clock 30 is provided to the bus controller and, in particular, to the memory device storing the series of instructions. Thus, the same external clock can be provided to several bus controllers in order to control and synchronize the operations of the bus controllers and the respective network busses.

Figure 4:
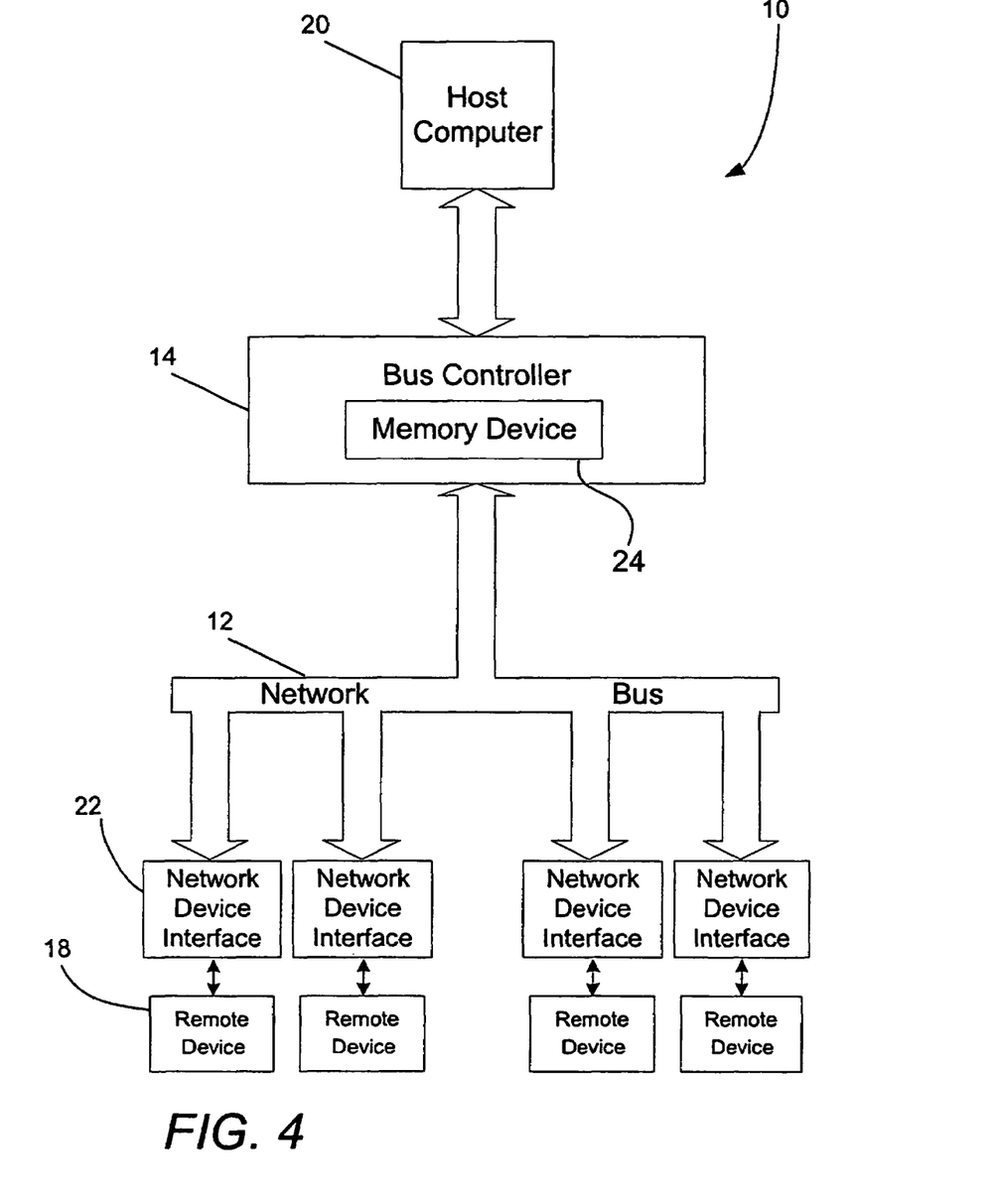
FIG. 4 is a schematic representation of a system according to another embodiment of the present invention that includes a single bus controller.

While a system 10 employing a network bus 12 that extends between a pair of bus controllers 14 and 16 has been illustrated and described, the system and method of the present invention are suitable for a wide variety of other network bus architectures. For example, the system can include a network bus having a single bus controller connected to the network bus, either at one end of the network bus or at any point along the network bus as depicted in FIG. 4.

According to any of the embodiments of the present invention, a system 10 and method are therefore provided for preloading a command schedule, typically in the form of a series of instructions, to a memory device 24 associated with a bus controller 14. Thereafter, the bus controller can execute the series of instructions in order to place appropriate commands to the network bus. By preloading the series of instructions into the bus controller, the workload of the host computer 20 is reduced. Reducing the workload of the host computer allows the host computer to perform other functions, such as performing system-wide operations and/or data analysis, while the bus controller executes the preloaded series of instructions. In addition, by permitting the bus controller to control execution of the series of instructions, the bus controller can ensure that commands are issued in a time deterministic manner so as to appropriately interact with the various network devices.

As illustrated and discussed above, the systems and methods of the present invention provide the capability to execute deterministic network processes without using the host processor. Specifically, the systems and methods of the present invention identify instances where the commands issued by the bus controller are network protocol specific and periodically repetitive, (i.e., a series of protocol commands that are repeated in periodic succession). The systems and methods of the present invention remove these repetitive series of commands from the operations that the host processor must perform and preloads the commands and data into a command schedule, typically in the form of a series of instructions. The command schedule is stored in the bus controller along with codes, referred to as microcode, for executing the command schedule. In operation, the repetitive commands are performed by the bus controller using the periodic command schedule, as opposed to the host processor.

As described thus far, however, the systems and methods of the present invention only preload command schedules that include series of commands and data that do not change during operation of the network system. In other words, the periodic command schedules only include fixed commands and data that are not alterable. As such, the periodic schedules only permit a continuous stream of preprogrammed data acquisition or outputs to be executed. While, this is acceptable for data acquisition applications or simple repetitive control sequences that do not require modification to the process, there are some instances where dynamic alteration of the commands or data listed in the command schedule during performance of the periodic command schedule is advantageous to allow the network system to achieve better process control. In other words, it would be advantageous to provide a preloaded command schedule having commands and data that could be altered or updated during operation based on the process associated with the network system.

For example, the network system may be used in conjunction with a process having variables that may change over time. As these variables change, the commands and data transmitted to the various network devices may need to be altered to ensure that the process is being adequately and precisely controlled in light of these changes. In these instances, some of the command and data preloaded into the command schedule should be altered to provide proper control.

In light of this, the system and methods of the present invention, in some embodiments, provide procedures permitting the host processor to modify the content and execution of the embedded command schedule to thereby provide better process control. The systems and methods of the present invention enable the host processor to receive and analyze data from the network, calculate analytical results, and produce appropriate process modifications that can be reinserted as commands or arguments into the command schedule. Although the host processor must periodically evaluate and modify the preloaded commands and data of the command schedule in these embodiments, the host processor is freed to perform higher level processing because the bulk of the processing in accordance with the command schedule is performed by the bus controller.

Figure 5:
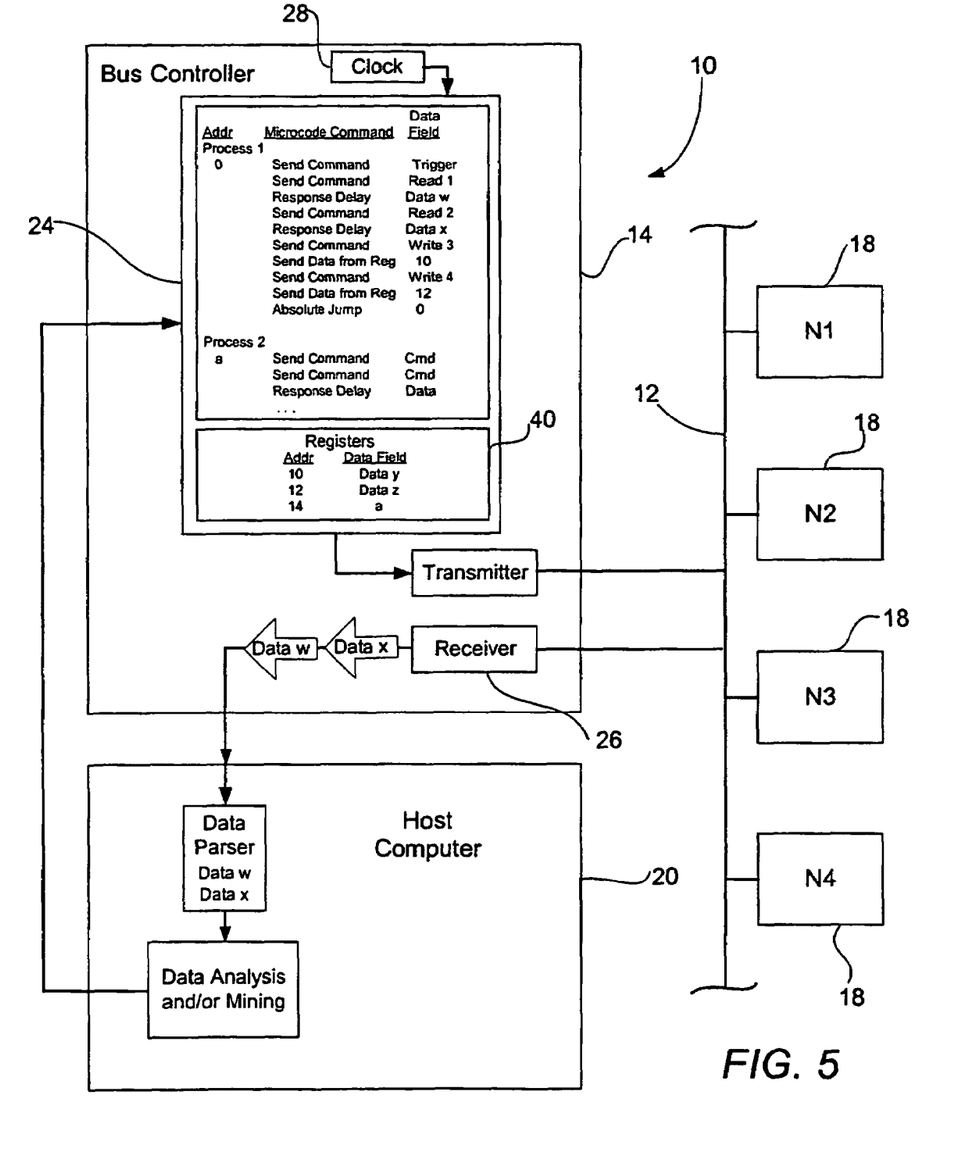
FIG. 5 is a block diagram of a system in accordance with one embodiment of the present invention which depicts operation of the Send Data From Register command according to one embodiment of the present invention.
Figure 6:
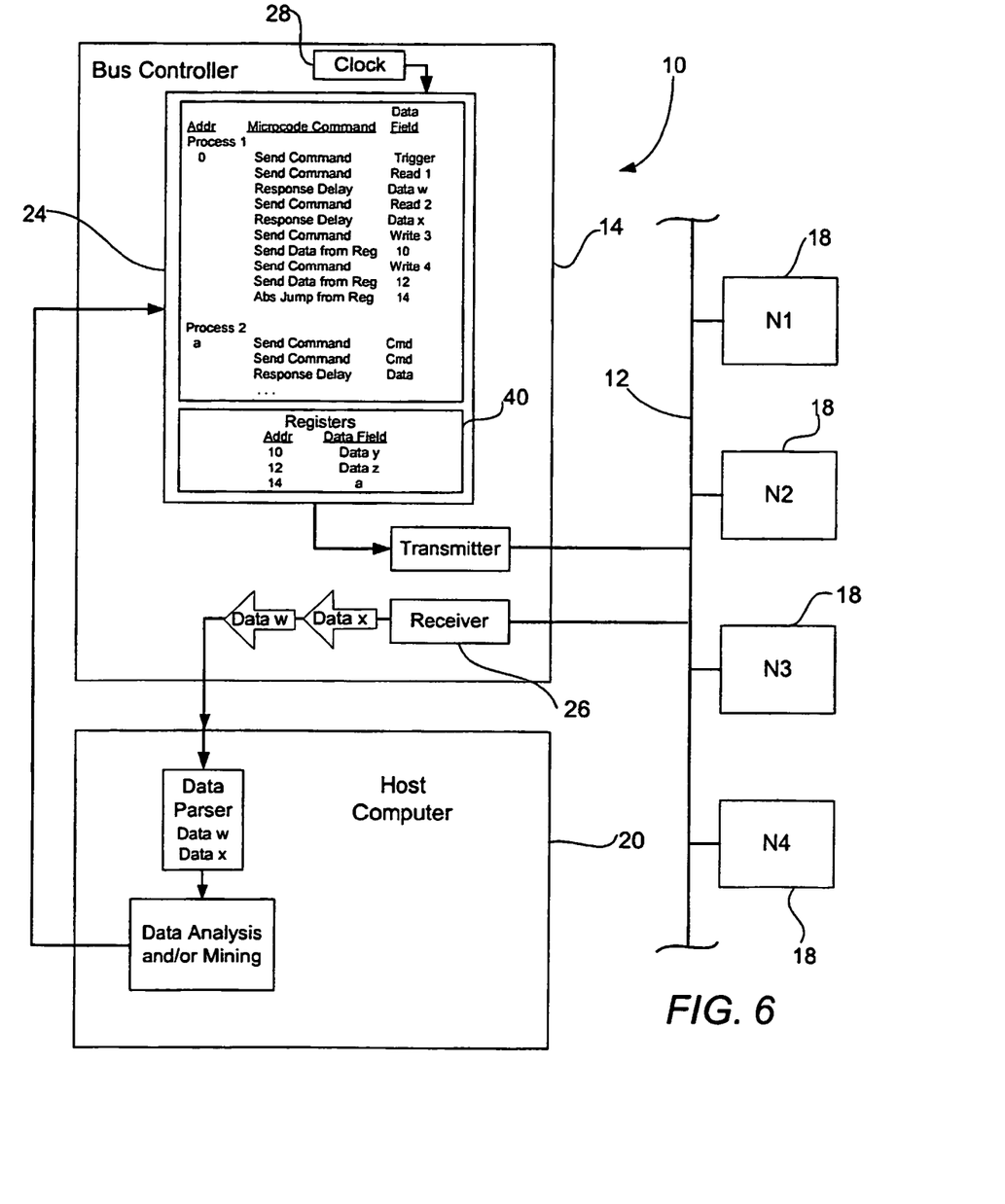
FIG. 6 is a block diagram of a system in accordance with one embodiment of the present invention which depicts operation of the Absolute Jump From Register command according to one embodiment of the present invention.

Importantly, with reference to FIGS. 5 and 6, the systems and methods of the present invention provide a series of registers 40 located in the memory device 24 associated with the bus controller. These registers, which are preferably 17 bits long, are used for storing values for variables in the command schedule. In other words, as the host processor analyzes data from the network system, it calculates analytical results and produces appropriate process modifications to these variables of the command schedule. These updates are stored in the registers, where they can be reinserted as commands or arguments into the command schedule.

To incorporate the updated or modified values into the command schedule, the systems and methods of the present invention include an added set of microcodes for loading values from the series of registers into the command schedule to alter variable commands and data in the command schedule to thereby provide better process control. These additional microcodes are provided in the following table:

| Action | Data Field |
| --- | --- |
| Send Command From Register | Address of internal register to retrieve command value |
| Send Data From Register | Address of internal register to retrieve data value |
| Delay From Register | Address of internal register to retrieve delay value |
| Absolute Jump From Register | Address of internal register to retrieve jump value |

The Send Command From Register microcode is similar to the more traditional Send Command, but the data in the data field is alterable by the host processor. Specifically, in the previous embodiments where the commands and data are preloaded and not reconfigurable, the Send Command sends the data in the data field, which is prestored with the command in the command schedule. However, the Send Command Register uses data from one of the registers 40 as the data for the command frame. The register is defined in the data field of the Send Command From Register microcode and, as such, the commands issued by the bus controller as the bus controller performs the command schedule are configurable by the host processor by merely changing the value stored in the appropriate register 40.

The Send Data From Register microcode command is similar to the Send Command From Register microcode, but is used to send data as opposed to a command. Specifically, the Send Command Register uses data from one of the registers 40 as the data for the data frame. The register is defined in the data field for the Send Data command and, as such, the data sent by the bus controller as it performs the command schedule is configurable by the host processor by merely changing the value stored in the appropriate register 40.

As discussed previously, the systems and methods of the present invention include delay microcodes that allow for specified delays in operation. In the previous embodiments in which the commands and data were preloaded and not reconfigurable, the data for the delay value is prestored with the delay command in the command schedule. However, the Delay From Register command uses data from one of the registers 40 as the data for the delay time. The register is defined in the data field for the Delay Command. And here again, the delay values sent by the Delay From Register commands issued by the bus controller as it performs the command schedule are configurable by the host processor by merely changing the value stored in the appropriate register 40.

Additionally, the systems and methods of the present invention include an Absolute Jump From Register microcode command. This command performs the same actions as the Absolute Jump code, with the exception that the data for absolute jump value comes from the registers 40 as opposed to a data field stored with the command in the command schedule, with the register defined in the data field for the Absolute Jump code. As with the other added commands, the jump values are configurable by the host processor by merely changing the value stored in the appropriate register 40 used as the data field for the command. As such, the host processor can control where the bus controller jumps in the command schedule by changing the value in the register.

With reference to FIGS. 5 and 6 examples of use of the Send Data From Register and Absolute Jump From Register commands are illustrated. For example with reference to FIG. 5, the series of instructions are stored beginning with memory address zero. Upon commencement of operations, the bus controller executes the initial microcode command, which is a Send Command. The Send Command has an associated data field that defines the command frame that is to be transmitted via the network bus 12 to be a trigger command. Thereafter, another Send Command is provided with the associated data field indicating that the command frame to be transmitted should be a read operation for the network device having address 1 (designated N1 in FIG. 2). The Response Delay command is then executed to allow the network device N1 an opportunity to provide data, designated w. Thereafter, another Send Command is executed and the associated data field indicates that a command frame to be transmitted should be a read operation for the network device having address 2 (designated N2 in FIG. 2). A Response Delay command is then executed to provide the network device N2 a period of time in which to provide the requested data, designed x.

With regard to the following set of commands, the command schedule includes the Send Data From Register command that allows the data associated with the command to be altered by the host processor. This method permits the host controller to put data back onto the network asynchronous to the network operation yet in real-time such that control operations data calculated from data extracted from the network and other sources can be placed onto the network in near real time.

Specifically, a Send Command is again executed with the data field associated with the Send Command indicating that data should be written to the network device having address 3 (designated N3 in FIG. 2). The data associated with the command is provided from the register 40 having address 10 using the Send Data From Register command. As such, the value y, which is stored in the register having address 10, is sent to the network device having address 3. Because value y is stored in one of the registers, value y is variable and is defined by the host processor.

Further, another Send Command is executed with the data field specifying that data should be written to the network device having address 4 (designated N4 in FIG. 2). Thereafter, a Send Data From Register command is again executed with the associated data field providing the data to be written to the network device N4 from the register having address 12. Again, the data designated z, which is stored in the register having address 12, is variable and configurable by the host processor based on the host processor's analysis of data from the network. In order to repeat this process, an Absolute Jump command is executed with the data field designating that the execution should jump to memory location zero, thereby effectively starting execution of the process over again. Thus, the series of instructions of this example periodically reads data provided by the network devices N1 and N2, such as first and second sensors, and periodically writes data to the network devices N3 and N4, such as third and fourth actuators.

With reference to FIG. 6, the Absolute Jump From Register command is illustrated. This command permits the host controller to branch from the main program loop to another program loop that may execute another set of code. Specifically, as illustrated, the host processor supplies the address for the Absolute Jump From Register Command. As illustrated, the address of the code for the second process (designated as address a) can be stored in the register having address 14, such that the bus controller switches to the second set of commands based on the analysis of the process performed by the host processor. At this point, it must be understood that FIGS. 5 and 6 are only illustrative embodiments of the use of the added microcodes. The microcodes have many conceivable uses in the context of a network system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for controlling operation of a network device via a network bus independent of operations of a host computer comprising:

a host computer;

at least one network device;

a network bus, wherein said at least one network device is in electrical communication with said network bus; and a bus controller disposed in electrical communication with both the network bus and said host computer for sending instructions to the at least one network device, wherein said bus controller comprises a memory device for storing a command schedule preloaded by the host computer comprising a series of instructions, wherein the series of instructions include at least one command to be executed by the at least one network device, wherein said bus controller is configured to execute the series of instructions including at least one of the instructions stored in the memory device in a manner independent of the operations of said host computer so as to control communications conducted with the at least one network device via the network bus, whereby said bus controller sends the at least one instruction to the network device and the network device executes the at least one command located in the at least one instruction independent of the operations of the host computer, wherein at least a first instruction of the series of instructions has at least one variable data field associated with variable data, wherein the memory device of said bus controller includes at least one register that is configured to store the variable data at a predefined address, wherein the bus controller including the memory device is configured to permit the host computer to change the variable data at the predefined address prior to execution of the first instruction in order to alter the variable data and therefore alter the first instruction, and wherein the at least one variable data field is configured to identify the predefined address such that when said bus controller executes the first instruction including the at least one variable data field said bus controller will retrieve the variable data from the memory device at the predefined address identified by the at least one variable data field, wherein said host computer is configured to periodically evaluate communications conducted via the network bus, and wherein said host computer is configured to alter the variable data associated with the at least one variable data field of the at least first instruction with a different value based upon the communications evaluated, and wherein the host computer is configured to store the different value in a register in the memory device and to reinsert the different value as a command or argument into the command schedule, and wherein the host computer is configured to alter the variable data during operation of the command schedule.

2. The system according to claim 1, wherein said host computer is configured to transfer the series of instructions to the memory device of said bus controller such that the bus controller is preloaded with the command schedule.

3. The system according to claim 2, wherein the memory device of said bus controller comprises a nonvolatile memory device, and wherein said host computer is configured to preload the series of instructions into the nonvolatile memory device no later than during execution of the series of instructions by the bus controller.

4. The system according to claim 2, wherein the memory device of said bus controller comprises a volatile memory device, and wherein said host computer is configured to preload the series of instructions into the volatile memory device before execution of the series of instructions by the bus controller.

5. The system according to claim 1, wherein said bus controller is configured to repeatedly execute the series of instructions in a time-deterministic manner.

6. The system according to claim 1, wherein said host computer is configured to preload said bus controller with the command schedule comprising a series of instructions such that said bus controller executes the command schedule so as to control communications with the at least one network device, and wherein said host computer is configured to evaluate communications on the network bus and altering the variable data field of the at least one instruction to thereby alter communications between said bus controller and the at least one network device on the network bus.

7. The system according to claim 1, wherein the memory device of said bus controller includes at least one register comprising the predefined address, wherein the at least one register is configured to store the variable data at the predefined address.

8. A method for controlling operation of at least one network device via a network bus independent of operations of a host computer comprising:
transferring a command schedule comprising a series of instructions from the host computer to a bus controller such that the bus controller is preloaded with the command schedule, wherein the series of instructions include at least one command to be executed by the at least one network device;
executing by the bus controller the series of instructions including at least one instruction of the series of instructions in a manner independent of the operations of the host computer so as to control communications conducted between a bus controller and the at least one network device via the network bus, wherein said executing transmits the at least one instruction to the at least one network device and the at least one network device executes the at least one command located in the at least one instruction independent of the operations of the host computer thereby permitting the host computer to perform the operations concurrent with the execution of the at least one instruction by the bus controller, wherein at least a first instruction of the series of instructions has at least one variable data field associated with variable data; and
altering the variable data by the host computer to thereby alter execution of the first instruction, wherein the variable data is stored at a predefined address, wherein the at least one variable data field identifies the predefined address, wherein altering the variable data comprises permitting the host computer to change the variable data at the predefined address prior to execution of the first instruction in order to alter the variable data and therefore alter the first instruction; and
periodically evaluating communications conducted via the network bus by the host computer as the series of instructions is executed, wherein said altering step comprises altering the variable data associated with the at least one variable data field of the at least first instruction with a different value based upon the communications evaluated, wherein the different value is stored in a register in a memory device and reinserted as a command or argument into the command schedule, and wherein the host computer is configured to alter the variable data during operation of the command schedule, and wherein said executing includes executing the first instruction including the at least one variable data field and retrieving the variable data based upon the predefined address identified by the at least one variable data field.

9. The method according to claim 8, wherein transferring the series of instructions comprises transferring a series of instructions to a nonvolatile memory device of the bus controller, and wherein transferring the series of instructions occurs no later than during execution of the series of instructions.

10. The method according to claim 8, wherein transferring the series of instructions comprises transferring a series of instructions to a volatile memory device of the bus controller.

11. The method according to claim 8, wherein executing the series of instructions comprises repeatedly executing the series of instructions in a time-deterministic manner.

12. A bus controller for controlling operation of a network device via a network bus independent of operations of a host computer comprising:
a transmitter configured to transmit instructions onto the network bus;
a receiver configured to receive data from the network bus; and
a memory device configured to store a command schedule preloaded by the host computer comprising a series of instructions, wherein the series of instructions include at least one command to be executed by the network device, wherein the bus controller is configured to execute the series of instructions and to send at least one of the instructions in said memory device to the network device over the network bus in a manner independent of a host computer so that the network device executes the at least one command in the one of the instructions independent of the operations of the host computer,
wherein said memory device stores at least a first instruction of the series of instructions having at least one variable data field associated with variable data, and wherein the variable data is configured to be altered by the host computer to thereby alter the first instruction executed by the bus controller,
wherein said memory device is configured to store the variable data at a predefined address, wherein the bus controller including the memory device is configured to permit the host computer to change the variable data at the predefined address prior to execution of the first instruction in order to alter the variable data and therefore alter the first instruction, wherein the at least one variable data field is configured to identify the predefined address such that when the bus controller executes the first instruction including the at least one variable data field said bus controller is configured to retrieve the variable data from the memory device at the predefined address,
wherein the memory is configured to receive different values for the variable data associated with the at least one variable data field of the at least first instruction from the host computer during operation of the command schedule based upon an periodic evaluation by the host computer of communications conducted via the network bus, wherein the different values are configured to be stored in registers in the memory device and the different values are configured to be reinserted as a command or argument into the command schedule.

13. The bus controller according to claim 12, wherein said memory device is configured to receive the series of instructions from the host computer such that the bus controller is preloaded with the command schedule.

14. The bus controller according to claim 13, wherein said memory device comprises a nonvolatile memory device, and wherein said memory device is configured to receive the series of instructions no later than during execution of the series of instructions by the bus controller.

15. The bus controller according to claim 13, wherein the memory device comprises a volatile memory device, and wherein said memory device is configured to receive the series of instructions before execution of the series of instructions by the bus controller.

16. The bus controller according to claim 12, wherein the bus controller is configured to repeatedly execute the series of instructions so as to control communications conducted with the at least one network device via the network bus.

17. The bus controller according to claim 12, wherein said memory device includes at least one register comprising the predefined address, and wherein the at least one register is configured to store the variable data at the predefined address.

* * * * *

UNITED STATES PATENT AND TRADEMARK OFFICE
CERTIFICATE OF CORRECTION

PATENT NO. : 7,617,330 B2
APPLICATION NO. : 10/475468
DATED : November 10, 2009
INVENTOR(S) : Ellerbrock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this

Nineteenth Day of October, 2010

David J. Kappos
*Director of the United States Patent and Trademark Office*